(12) United States Patent
Majima

(10) Patent No.: US 6,772,720 B2
(45) Date of Patent: Aug. 10, 2004

(54) VALVE TIMING CONTROL DEVICE FOR INTERNAL COMBUSTION ENGINE

(75) Inventor: Yoshihiro Majima, Inuyama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/265,690

(22) Filed: Oct. 8, 2002

(65) Prior Publication Data

US 2003/0070637 A1 Apr. 17, 2003

(30) Foreign Application Priority Data

Oct. 12, 2001 (JP) ........................................ 2001-315828

(51) Int. Cl.[7] ................................................. F01L 1/34
(52) U.S. Cl. ............................... 123/90.15; 123/90.16; 123/90.17; 123/90.18
(58) Field of Search ........................... 123/90.15, 90.16, 123/90.17, 90.18

(56) References Cited

U.S. PATENT DOCUMENTS

| | | | |
|---|---|---|---|
| 6,266,957 B1 | * 7/2001 | Nozawa et al. | 60/284 |
| 6,494,173 B2 | * 12/2002 | Takahashi et al. | 123/90.15 |
| 6,499,450 B2 | * 12/2002 | Takahashi et al. | 123/90.15 |
| 6,513,319 B2 | * 2/2003 | Nozawa et al. | 60/284 |
| 2001/0050067 A1 | 12/2001 | Sato | |

\* cited by examiner

Primary Examiner—Thomas Denion
Assistant Examiner—Ching Chang
(74) Attorney, Agent, or Firm—Nixon & Vanderhye P.C.

(57) ABSTRACT

A valve timing control device for an internal combustion engine, in which upon cold start, combustion gas containing quench hydrocarbons and wet fuel is confined in a combustion chamber by advancing an exhaust valve close timing. This combustion gas is richer in hydrocarbons and wet fuel than is the gas produced after the engine has been warmed up. When the pressure in an intake line becomes lower than 600 mmHg, the exhaust valve close timing is retarded so as to recirculate post-combustion gas back to the combustion chamber. Then the unburned hydrocarbons in the post-combustion gas are involved in combustion again and their emission is reduced. Such gas recirculation and confinement to the combustion chamber are switched in accordance with a target valve underlap corresponding to the intake line pressure in the internal combustion engine.

10 Claims, 9 Drawing Sheets

| COOLANT TEMPERATURE (INTAKE TEMPERATURE) | 0 | 10 | 20 | 30 | 40 |
|---|---|---|---|---|---|
| EXHAUST VALVE CLOSE TIMING, VCTBSE | 5 | 10 | 15 | 15 | 5 |

| INTAKE AIR AMOUNT, Ga \ IGNITION TIMING | BTDC 10 | TDC 0 | ATDC 10 |
|---|---|---|---|
| 1 | 200 | | |
| 10 | | | 800 |

| ESTIMATED A/F | 13 | 14 | 15 |
|---|---|---|---|
| CORRECTION COEFFICIENT, FABF | 0.9 | 1 | 1.1 |

| LAPSE OF TIME SINCE ENGINE START | 1 | 5 | 10 |
|---|---|---|---|
| CORRECTION COEFFICIENT, FTIME | 0.9 | 1 | 1.05 |

DURING CATALYST EARLY
WARM-UP CONTROL UPON
COLD START

RECIRCULATION OF
UNBURNED HC

STABILIZE COMBUTION

FIG. 15A
ENGINE ROTATION SPEED
Ne(rpm)
A DECISION OF ENGINE START
B PRESSURE IN INTAKE LINE
   Pm=600mmHg
C CONDITION FOR POST-COMBUSTION
   BURN IS MET
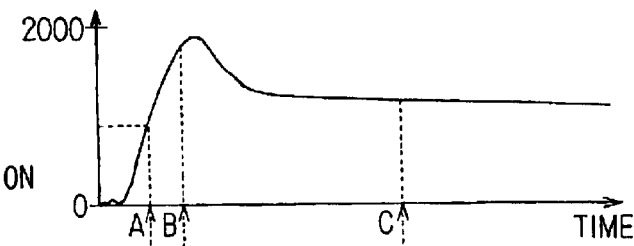
FIG. 15B
IGNITION TIMING
FIG. 15C
INTAKE VALVE OPEN TIMING
FIG. 15D
EXHAUST VALVE CLOSE TIMING
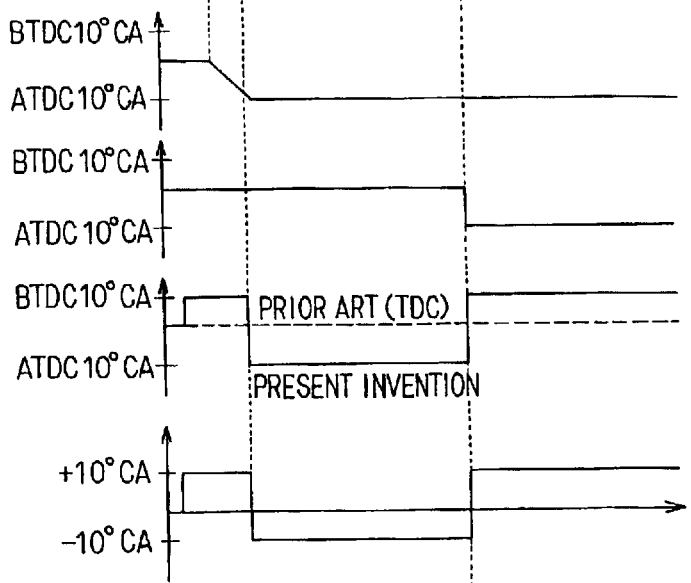
FIG. 15E
TARGET UNDERLAP
FIG. 15F
AIR-TO-FUEL RATIO
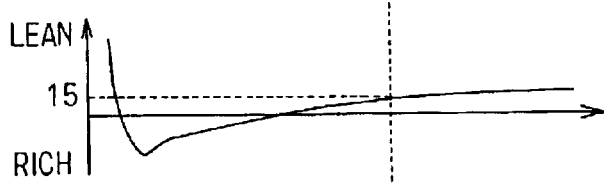
FIG. 15G
EXHAUST GAS TEMPERATURE
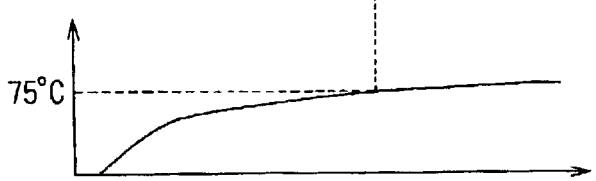
FIG. 15H
AMOUNT OF DISCHARGED, UNBURNED HC
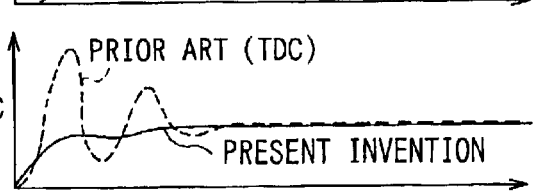

VALVE TIMING CONTROL DEVICE FOR INTERNAL COMBUSTION ENGINE

CROSS REFERENCE TO RELATED APPLICATION

This application is based upon, claims the benefit of priority of, and incorporates by reference the contents of prior Japanese Patent Application No. 2001-315828 filed Oct. 12, 2001.

BACKGROUND OF THE INVENTION

1. Field of the Invention

The present invention relates to a valve opening and valve closing timing control device for use in internal combustion engines.

2. Description of the Related Art

Generally, governmental requirements with respect to hazardous gas emissions from internal combustion engines have become increasingly tough in recent years. To reduce the emission of hazardous gases, a variety of technologies are now under development. When a catalytic converter is inactive, for example, during a cold start of an internal combustion engine, a lot of hazardous gases are discharged. It is known that the three-way catalyst, which is a popular material for catalytic converters, exhibits its highest performance when it is in an active state and the air-to-fuel ratio is maintained at its theoretical value. However, since the catalytic converter is not activated at cold start, the hazardous gases produced by combustion are not decomposed and are discharged, as combusted, into the atmosphere, this results in a poor quality of exhaust gas being discharged into the atmosphere.

Japanese Unexamined Patent Application Publication No. Hei. 11-336574 discloses a technology for reducing hydrocarbon (HC) gases which are part of the hazardous gases. It converts post-combustion gas, after being discharged to the exhaust line, back to the cylinder of the internal combustion engine by controlling the duration of the time that both intake and exhaust valves are open at the same time, which is called the valve overlap.

It is possible to burn the unburned HCs in the post-combustion gas and thereby reduce HC emissions by recirculating the post-combustion gas, once it is discharged to the exhaust line, back into the cylinder. If a lot of post-combustion gas is returned to the cylinder, however, the state of combustion becomes unstable because of the increased ratio of the post-combustion gas to the pre-combustion gas. The technique disclosed in Japanese Unexamined Patent Application Publication No. Hei. 11-336574 sets the valve overlap at a value below a predetermined level in order to prevent the amount of post-combustion gas being recirculated to the cylinder from increasing. Then, since the period of time that both intake and exhaust valves are open is shortened, the amount of recirculated gas can be properly limited to avoid the above problem.

Note that the amount of combustion gas that will be returned is determined by the degree of valve overlap and pressure difference between the intake line and the exhaust line. If the pressure in the intake line does not differ much from that in the exhaust line, a sufficient amount of exhaust gas is not returned to the cylinder. As a result, the effect of burning yet-burned HCs is not fully achieved.

This is particularly a problem during engine starting. At the moment the engine is started, the engine has not reached its idle speed, and therefore the pressure in the intake line is not low enough to pull post-combustion gas back into the cylinder. It then becomes impossible to take in a sufficient amount of post-combustion gas during engine starting by the technology disclosed in Japanese Unexamined Patent Application Publication No. Hei. 11-336574 that introduces combustion gas back into the cylinder by retarding the closure of the exhaust valve by controlling valve overlap. Particularly during cold start, unburned HCs are discharged into the air as they are because the catalytic converter has not yet been activated.

Part of the fuel injected during a cold start is not involved in combustion, and does not burn well in the cylinder but adheres to the cylinder wall. This is because fuel is not sprayed into the cylinder very well upon cold start, compared with that sprayed during normal engine operation. Since the fuel lodged onto the cylinder walls is less exposed to air, it is further less involved in combustion. Such unburned HC adhering to the cylinder wall is scraped up by the piston and discharged into the exhaust line when the exhaust valve opens. This HC is referred to as quench HC.

SUMMARY OF THE INVENTION

An object of the present invention is therefore to provide a valve timing control device for internal combustion engines in order to reduce the emissions of unburned HC.

Another object of the invention is to provide a valve timing control device that can reduce the amount of unburned HC discharged into the exhaust line including during a cold start.

According to a first aspect of the present invention, a valve timing control device for an internal combustion engine includes an exhaust valve control means for controlling at least a close timing of an exhaust valve installed in an internal combustion engine and a first engine condition detection means for detecting or estimating a condition of the internal combustion engine. The exhaust valve control means advances or retards the exhaust valve close timing from an intake top dead center based on the engine condition detected or estimated by the engine condition detection means.

It then becomes possible to retain post-combustion gas in the combustion chamber by advancing the close timing of the exhaust valve when the first engine condition detection means detects an engine condition under which a sufficient amount of post-combustion gas cannot be returned to the combustion chamber. If the post-combustion gas is retained in the combustion chamber, it becomes possible that unburned hydrocarbons in the combustion gas (hereafter called unburned HCs) will be involved in combustion during the next combustion round. Therefore, hazardous gas emissions are reduced. Meanwhile, when a sufficient amount of post-combustion gas can be recirculated into the combustion chamber by retarding the exhaust valve close timing, it becomes possible to reduce unburned HC emissions by reintroducing the unburned HCs in combustion. The above approach can accomplish the first goal of reducing emissions by cutting unburned HC.

According to a second aspect of the present invention, the first engine condition detection means detects or estimates pressure in an intake line or a parameter related to pressure as the operation condition of the internal combustion engine. The exhaust valve control means advances the exhaust value close timing from intake top dead center when the pressure or parameter detected or estimated by the first engine condition detection means is larger than a predetermined value while retarding the exhaust value close timing from the intake top dead center when the pressure or parameter detected or estimated by the first engine condition detection means is smaller than a predetermined value.

Then it becomes possible to advance or retard exhaust valve closure based on the pressure in the intake line or a parameter related to the pressure. Specifically, when the pressure difference between the intake line and the exhaust line is small, the close timing of the exhaust valve is advanced to confine the post-combustion gas in the combustion chamber to burn the unburned HC. On the other hand, when the pressure difference between the intake line and the exhaust line is large, the combustion gas discharged in the exhaust line can be recirculated to the combustion chamber. Then the unburned HC is consumed in combustion, thereby reducing emissions. The above configuration can also accomplish the first goal of reducing emissions by cutting unburned HC.

According to a third aspect of the present invention, the valve timing control device may further include a second engine condition detection means for detecting the condition of the internal combustion engine. The second engine condition detection means estimates an amount of wet fuel adhering to the intake line and/or an amount of unburned hydrocarbons adhering to a cylinder wall of the internal combustion engine. The wet fuel and hydrocarbons are included in fuel injected from an injector supplying fuel to the internal combustion engine. The exhaust valve control means sets a degree of advance for the exhaust valve close timing from the intake top dead center based on the estimated amount of the wet fuel and/or unburned hydrocarbons adhering to the cylinder wall when advancing the exhaust value close timing based on the condition of the internal combustion engine.

Then it becomes possible to estimate the amount of wet fuel and unburned HC that are produced upon cold starting and that adheres to the cylinder wall, or becomes quench HC, even when a lot of such HC and wet fuel are produced. Because the exhaust valve closure timing can be advanced with reference to the estimates, the amount of post-combustion gas retained in the combustion chamber can be optimized. Then, since the unburned HC in the combustion gas is involved in combustion again, the emission of unburned HC from the engine can be cut.

It is a well-known technology to open both the intake valve and the exhaust valve in order to recirculate post-combustion gas, once discharged to the exhaust line, to the combustion chamber. The amount of combustion gas to be returned, however, is determined by a pressure difference between the exhaust line and the intake line. Thus, if the pressure in the intake line is near atmospheric pressure, and as a result, the pressure difference is small between the exhaust line and the intake line, it is theoretically difficult to return the unburned gas to the combustion chamber by opening both the exhaust valve and the intake valve.

In such a case, according to a fourth aspect of the present invention, if the first engine condition detection means indicates that it possible to recirculate combustion gas to the combustion chamber, the exhaust valve control means controls a degree of retarding the exhaust valve closing timing from the intake top dead center. This occurs so that a period of time of both the intake valve and the exhaust valve of the internal combustion engine are open agrees with a predetermined period when retarding the exhaust valve close timing from the intake top dead center position based on the condition of the internal combustion engine detected by the first engine condition detection means.

Then it becomes possible to set the closure timing of the exhaust valve based on the period of time both valves are open and to precisely control the amount of post-combustion gas that will be recirculated to the combustion chamber.

According to a fifth aspect of the present invention, the valve timing control device further includes an intake valve control means for controlling at least an intake valve open timing. The second engine condition detection means includes a combustion state detection means for detecting a combustion state of the internal combustion engine. The intake valve control means retards the intake valve open timing when the combustion state detection means detects a condition meeting requirements for unburned hydrocarbons in the exhaust line to oxidize. The exhaust valve control means advances the exhaust valve close timing when the combustion state detection means detects stable combustion.

When unburned hydrocarbons can be oxidized, the unburned hydrocarbons are consumed in oxidation in the exhaust line when unburned hydrocarbons are discharged to the exhaust line. Under such a condition, the control according to the fifth aspect of the present invention is useful to stabilize combustion. Specifically, if the open timing of the intake valve is retarded, the intake flow speed increases because of the pressure difference between the intake line and the combustion chamber. Then fuel can then be better sprayed and the state of combustion can be improved. Further, by advancing the close timing of the exhaust valve under the above condition, the amount of post-combustion gas once discharged to the exhaust line and then returned to the combustion chamber is reduced, which contributes to the improvement of combustion stability.

According to a sixth aspect of the present invention, the valve timing control device further includes an air-to-fuel ratio detection means for detecting an air-to-fuel ratio in the internal combustion engine. The device also includes an exhaust temperature detection means for detecting or estimating a temperature of exhaust gas discharged from the internal combustion engine. The combustion state detection means decides that the combustion state of the internal combustion engine is stable if the exhaust temperature detection means detects or estimates an exhaust temperature higher than a predetermined temperature. At the same time, the air-to-fuel ratio detection means detects a combustion gas air-to-fuel ratio falling within a predetermined lean range. The exhaust valve control means advances the exhaust valve close timing based on the detection results provided by the combustion state detection means.

The combustion gas discharged to the exhaust line includes unburned HC. The invention checks whether the unburned HC in the post-combustion gas can be oxidized in the exhaust line based on the air-to-fuel ratio and the temperature of the exhaust gas. When the unburned HC can be oxidized in the exhaust line, the close timing of the exhaust valve is advanced to reduce the amount of post-combustion gas that will be returned to the combustion chamber and thereby stabilize combustion.

As previously described, the combustion gas produced at cold start contains a lot of wet fuel and quench HC. The prior art technique controls the period of time both intake valve and exhaust valve are open so as to reduce such quench HC and wet fuel. There is, however, a concern that a sufficient amount of post-combustion gas in the exhaust line will not be returned to the combustion chamber. This occurs when a small pressure difference between the intake line and the exhaust line renders it difficult to re-circulate the combustion gas to the combustion chamber.

According to a seventh aspect of the present invention, a valve timing control device for an internal combustion engine includes an exhaust valve control means for controlling at least the close timing of the exhaust valve installed in the internal combustion engine and a second engine condition detection means for detecting or estimating the condition of the internal combustion engine. The exhaust valve control means advances the exhaust valve close timing from intake top dead center based on the engine condition detected or estimated by the second engine condition detection means since cold starting of the engine.

Then it becomes possible to confine the post-combustion gas rich in quench HC and wet fuel in the combustion chamber. Since such quench HC and wet fuel can be returned to combustion, the amount of unburned HC and its emission can be reduced. As a result, the second goal of the invention to cut unburned HC in the exhaust line, even during cold starting, can be accomplished.

According to an eighth aspect of the present invention, the second engine condition detection means estimates the amount of wet fuel adhering to the intake line and/or the amount of unburned hydrocarbons adhering to the cylinder wall of the internal combustion engine, the wet fuel and hydrocarbons being included in the fuel injected from the injector supplying fuel to the internal combustion engine. The exhaust valve control means sets the degree of advance of the exhaust valve close timing from the intake top dead center position based on the estimated amount of the wet fuel and/or unburned hydrocarbons adhering to the cylinder wall when advancing the exhaust value close timing from the intake top dead center position based on the condition of the internal combustion engine detected by the second engine condition detection means.

Then it becomes possible to estimate the amount of wet fuel and unburned HC, or quench HC, produced upon cold starting of the engine and adhered to the cylinder wall, even when a lot of quench HC and wet fuel are produced. Because the exhaust valve close timing is advanced with reference to the estimates, the amount of combustion gas confined in the combustion chamber can be raised. As a result, since the unburned HC in post-combustion gas is involved in combustion again, the emission of unburned HC from the engine can be cut and emission quality can be improved.

According to a ninth aspect of the present invention, a valve timing control device for an internal combustion engine includes an exhaust valve installed in the internal combustion engine and an exhaust valve control means for controlling at least the close timing of the exhaust valve. Furthermore, the exhaust valve control means advances the exhaust valve close timing from the intake top dead center position upon cold starting of the internal combustion engine.

Then it becomes possible to confine the post-combustion gas rich in unburned HC in the combustion chamber. The unburned HC is returned to the combustion chamber even if the pressure difference between the intake line and the exhaust line is small. As a result, the amount of HC and its emission can be reduced.

According to a tenth aspect of the present invention, the valve timing control device further includes a combustion gas treatment means that is installed in the exhaust line of the internal combine engine and treats combustion gas discharged from the internal combustion engine. Additionally, a treatment capability detection means is provided for detecting or estimating the combustion gas treatment capability of the combustion gas treatment means. The exhaust valve control means advances the exhaust valve close timing from the intake top dead center position upon starting of the internal combustion engine when the treatment capability detection means detects a low combustion gas treatment capability in the combustion gas treatment means.

Unless the combustion gas treatment means has a sufficient combustion gas treatment capability, there is concern that part of the unburned HC produced during combustion may be discharged into the air, that is, with no treatment. Thus, in order to reduce the amount of unburned HC, the close timing of the exhaust valve is advanced beyond the intake top dead center position. This makes it possible to confine post-combustion gas in the combustion chamber and to have the unburned HC included in the post-combustion gas again undergo combustion. As a result, the emission of unburned HC is reduced and the quality of exhaust gas is improved.

There are two methods for reducing unburned HC included in post-combustion gas. As previously described, the combustion gas may be confined in the combustion chamber, and alternatively the post-combustion gas may be returned to the combustion chamber. When the pressure difference between the intake line and the exhaust line is small, it is difficult by the latter method to return a sufficient amount of post-combustion gas to combustion because this method relies on a pressure difference between intake and exhaust lines. Specifically, since the pressure in the intake line of the internal combustion engine is close to atmospheric pressure upon engine starting, it is difficult to re-circulate the discharged combustion gas to the combustion chamber.

Thus according to an eleventh aspect of the present invention, the exhaust valve control means retards the exhaust valve close timing from the intake top dead center position when a predetermined time has passed since the start of the internal combustion engine.

After the predetermined period of time that the rotation speed of the internal combustion engine has increased, the pressure in the intake line becomes increasingly low and the pressure difference from the exhaust line becomes increasingly large. Then it becomes possible to return the post-combustion gas to the combustion chamber and thereby to reduce the emission of unburned HC. The above predetermined period may be modified by the rotational speed of the internal combustion engine, accumulated rotations, frequency of ignitions, accumulated amount of intake air and other factors.

According to a twelfth aspect of the present invention, a valve timing control device for an internal combustion engine includes an exhaust valve installed in the internal combustion engine and an exhaust valve control means for controlling at least the close timing of the exhaust valve. The exhaust valve control means advances the exhaust valve close timing from the intake top dead center position when a desired amount of combustion gas, once discharged from the internal combustion engine to the exhaust line, cannot be recirculated into the cylinder of the internal combustion engine.

Then, even when a desired amount of post-combustion gas cannot be returned, the post-combustion gas is retained in the combustion chamber so as to have unburned HC discharged from the internal combustion engine involved in the next round of combustion. As a result, the amount of unburned HC is reduced in the combustion gas discharged from the internal combustion engine, and the degradation of exhaust gas quality can be prevented.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 15A–15H are timing charts of various parameters of an embodiment of the present invention.

DETAILED DESCRIPTION OF THE PREFERRED EMBODIMENTS

The following description of the preferred embodiments is merely exemplary in nature and is in no way intended to limit the invention, its application, or uses.
(First Embodiment)

Figure 1:
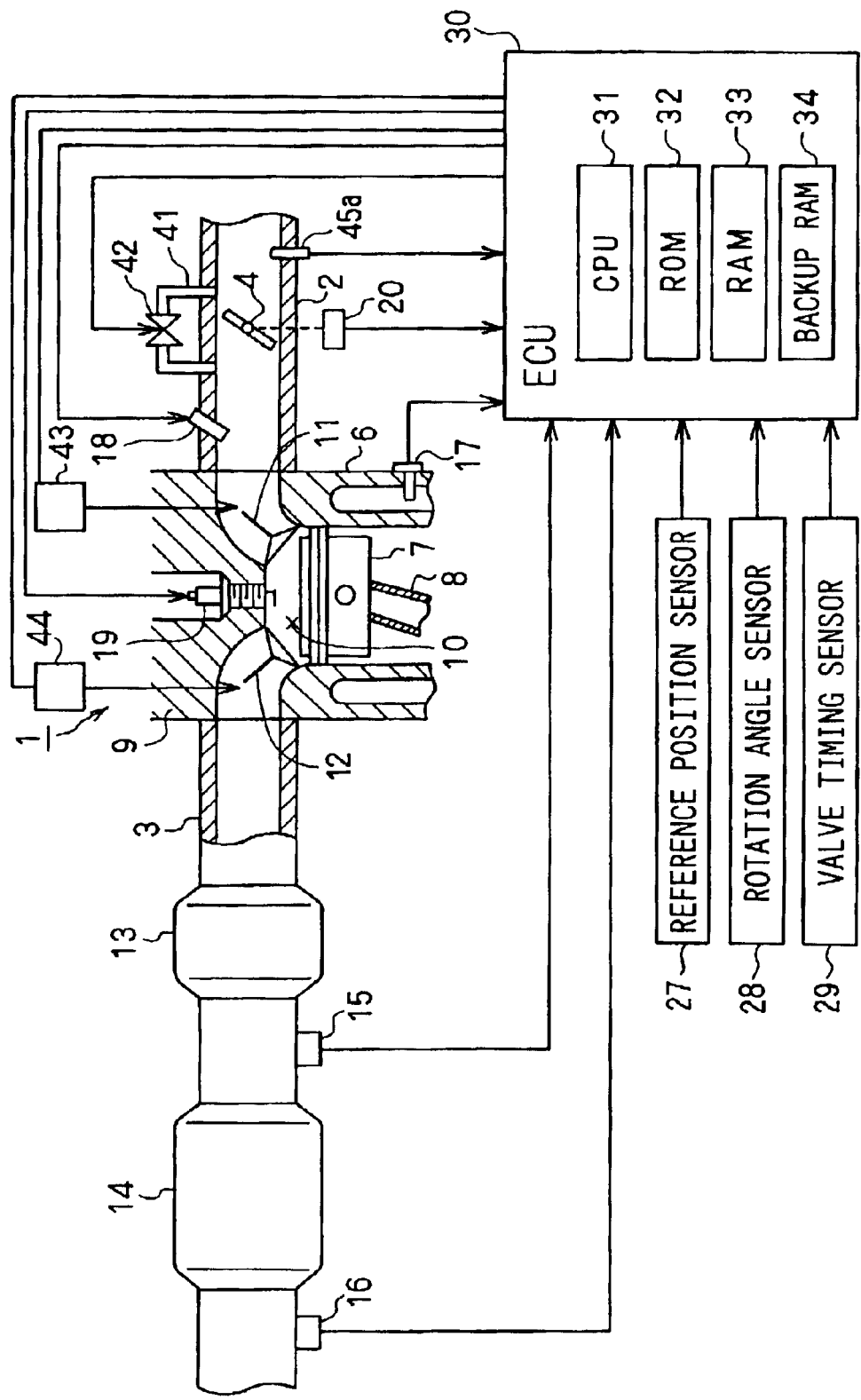
FIG. 1 is a schematic diagram illustrating the overview of a first embodiment of the present invention.

FIG. 1 is a diagram illustrating the structural overview of the valve timing control device for internal combustion engines according to the present embodiment. Referring now to FIG. 1, the engine 1 is a spark-ignition type 4-cycle multi-cylinder engine. Its intake port and exhaust port are connected to an intake line 2 and an exhaust line 3, respectively. The intake line 2 has a throttle valve 4 that works in conjunction with the accelerator (not shown) and an air flowmeter 45a that measures the amount of intake air. The degree of opening of the throttle valve 4 is measured by a throttle sensor 20 which can even detect full close of the throttle valve 4.

A cylinder 6 of the engine 1 has a piston 7 that reciprocates in the vertical direction in FIG. 1, and the piston 7 is connected to a crankshaft (not shown) via a connection rod 8. Above the piston 7 is a combustion chamber 10 that is defined by the cylinder 6 and cylinder head 9. The combustion chamber 10 is connected to the intake line 2 and the exhaust line 3 via an intake valve 11 and an exhaust valve 12, respectively. The cylinder 6 (water jacket) has a coolant temperature sensor 17 for measuring the engine coolant temperature.

The exhaust line 3 has two catalytic converters 13 and 14, and these catalytic converters 13 and 14 contain a three-way catalyst that decomposes three elements in the exhaust gas-hydrocarbon (HC), CO and $NO_x$. The upstream catalytic converter 13, which is smaller in capacity than the downstream catalytic converter 14, works as a start catalyst which is warmed up early upon engine starting. The upstream catalytic converter 13 is located about 300 mm away from the end of the engine exhaust port.

Upstream (upstream of the exhaust flow) of the catalytic converter 14 is an A/F sensor 15 that is a limiting current type air-to-fuel (A/F) ratio sensor. This A/F sensor 15 provides an air-to-fuel ratio signal that is linear and proportional, over a wide range, to oxygen concentration in the exhaust gas (or carbon monoxide concentration in the unburned gas). Downstream of the catalytic converter 14 is an $O_2$ sensor 16 that provides different voltage signals depending on whether the air-to-fuel ratio is either rich or lean when compared to the theoretical air-to-fuel ratio (stoichiometric ratio).

A fuel supply system (not shown) supplies high-pressure fuel to the electromagnetic injector 18. The electromagnetic injector 18 is driven by an electric current and injects fuel into the engine intake port. The present embodiment has a multi-point injection (MPI) system which has one injector 18 in each branch of the intake manifold. An ignition plug 19 installed in the cylinder head 9 generates spark, driven by a high voltage for ignition provided by an ignition coil (not shown).

In this case, the new gas supplied from upstream of the intake line and the fuel supplied from the injector 18 are mixed in the engine intake port, and this mixture flows in the combustion chamber 10 driven by the intake valve 11. The fuel flown into the combustion chamber 10 is ignited by the ignition plug 19 for combustion. The mixture after combustion is discharged through an opened exhaust valve 12.

The open and close operations of the intake valve 11 and exhaust valve 12 are controlled by valve timing control mechanisms 43 and 44, respectively. Now the structure of the valve timing control mechanisms, which control the open and close timing of the intake valve 11 and exhaust valve 12, is explained below. Since the valve timing control mechanisms 43 and 44 have the same structure, only the valve timing control mechanism 44 for the exhaust valve 12 is described with reference to FIG. 2. An explanation of the valve-timing control mechanism 43 for the intake valve 11 is omitted.

Figure 2:
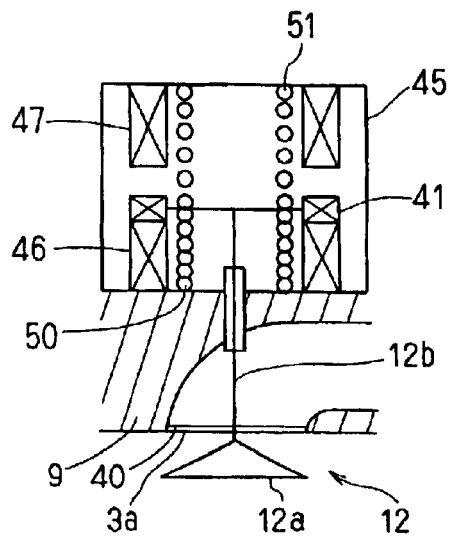
FIG. 2 is a schematic diagram illustrating the structure of the electromagnetic valve of the first embodiment.

As shown in FIG. 2, the exhaust valve 12, which is mounted in the cylinder head 9 to move vertically, is composed of a valve 12a and a valve stem 12b. The exhaust valve 12a form fits to a valve seat 40 that is formed in the periphery 3a of the opening of the exhaust line 3 which opens to the cylinder head 9. The head of the valve stem 12b is connected to a movable unit 41 made of a magnetic material. This movable unit 41 is housed in a casing 45 located above the cylinder head 9.

In the casing 45, a coil 46 for valve opening and a coil 47 for valve closing are installed in the positions where they sandwich the movable unit 41 in the vertical direction so that the movable unit 41 is allowed to move up and down between them. In the outer periphery of the valve stem 12b inside the valve-opening coil 46, a spring 50 is installed so as to constantly bias the exhaust valve 12 in the valve-close direction (upward in FIG. 2). Inside the valve-closing coil 47 on the opposite side across the movable unit 41, another spring 51 is installed so as to bias the exhaust valve 12 in the valve-open direction (downward in FIG. 2).

In order to open the intake valve 11 and the exhaust valve 12, an electric current is supplied to the valve-opening coil 46 based on a valve-opening signal sent from an electronic control unit (ECU) 30. The electromagnetic force created by the electric current running in the valve-opening coil 46 pulls the movable unit 41 made of a magnetic material, and then the exhaust valve 12 opens. Similarly, to close the exhaust valve 12, the ECU 30 sends a valve-closing signal runs electric current through the valve-closing coil 47 so that the movable unit 41 is attracted toward the valve-closing coil by electromagnetic force. In this way, the open and close timings of the intake valve 11 and the exhaust valve 12 are controlled by the signal from the ECU 30.

Next, the ECU 30 will be described. The primary part of the ECU 30 is a microcomputer comprising, for example, CPU 31, ROM 32, RAM 33 and backup RAM 34. The ECU 30 receives the output signals from the air flowmeter 45a, A/F sensor 15, $O_2$ sensor 16, coolant temperature sensor 17, throttle sensor 20 and valve timing sensor 29 to learn the engine conditions such as the amount of intake air, Qa, air-to-fuel ratios (A/F) upstream and downstream of the catalyst, engine coolant temperature, Thw, an opening degree of the throttle and open and close timings of the intake valve 11 and exhaust valve 12. Further, the ECU 30 is connected to a reference position sensor 27 that provides pulse signals at every 720° of crank angle (CA) and a rotation angle sensor 28 that provides pulse signals at shorter intervals, for example, 30° CA. The ECU 30 learns the reference crank position (G signal) and engine rotation speed Ne based on the pulse signals sent from the sensors 27 and 28.

Based on such detected engine conditions, the ECU 30 controls the fuel injection conducted by the injector 18, ignition timing for the ignition plug 19 and opening and closing of the electromagnetic intake and exhaust valves 11, 12. The details of their specific operations will be discussed later.

Next, detailed operation of the ECU 30 will be explained. In the embodiment, the ECU 30 carries out:

(1) Increasing the amount of intake air from the usual level at idle;

(2) Controlling the ignition timing on the retarded side;

(3) Setting combustion to the lean side by reducing the amount of injected fuel;

(4) Advancing the exhaust valve 12 upon engine starting;

(5) Retarding the exhaust valve 12 when the pressure in the intake line 2 has reached the predetermined level after engine starting; and (6) Retarding the intake valve 11 when combustion is stabilized after engine starting and advancing the exhaust valve 12.

In process (1), the heat given to the catalyst increases as the amount of intake air increases. Specifically, since the amount of fuel injection is determined by the amount of intake air, the amount of fuel injection increases as the amount of intake air increases. Then, the heat supplied to the catalyst increases, and the catalyst becomes active, earlier. In process (2), the ignition timing is retarded across the top dead center (TDC) of the piston 7. Since ignition is made at a point in time when the compression ratio is smaller than that at TDC, the combustion develops slowly and continues even after the exhaust valve 12 has opened. As a result, high-temperature gas produced by combustion is discharged in the exhaust line 3, and the catalyst quickly becomes active, heated by the high-temperature gas.

Further, as described in process (3), the amount of fuel injection is controlled to provide a lean air-to-fuel ratio during combustion. Then, since the temperature of the exhaust gas is high due to the delayed ignition, unburned HC discharged to the exhaust line is oxidized by heat and thereby the emissions become cleaner. In other words, the oxidization of unburned HC in the exhaust line is facilitated because there exists a sufficient amount of oxygen in the lean gas and because it is exposed to high temperatures. The phenomenon of unburned HC being oxidized after combustion is called "post-combustion burn."

Before explaining process (4), the behavior of unburned HC produced upon cold start is discussed. When the engine 1 is started when cold, the amount of wet fuel adhering to the intake port increases because the engine temperature is low. In addition, because the spraying of fuel is not sufficient, combustion is unstable and thus unburned HC not involved in combustion adheres to the cylinder wall. Since the unburned HC on the cylinder wall (quench HC) has a small portion of the surface exposed to air, it is less involved in combustion than the other unburned HC. Such quench HC is accumulated (scraped up) by the piston and discharged into the exhaust line 3 as it is when the exhaust valve opens.

In the prior art, so-called valve overlap control, that is, the period of the time both intake valve 11 and exhaust valve 12 are open at the same time, is controlled by retarding the open state of the exhaust valve 12 so that unburned HC including quench HC may return to the cylinder. The recirculation of post-combustion gas by the valve overlapping, however, depends on the pressure difference between the intake line and the exhaust line. If the pressure in the intake line is close to atmospheric pressure, a sufficient amount of post-combustion gas cannot be returned to the cylinder.

In process (4), therefore, the unburned HC (wet fuel and quench HC) remaining in the post-combustion gas are retained in the combustion chamber 10 by advancing the close timing of the exhaust valve 12. Because the unburned HC is burned in the next round of combustion, emissions can be reduced. In process (5), the period of the time both exhaust valve 12 and the intake valve 11 are open (valve overlap period) is extended by retarding the exhaust valve 12. Then it becomes possible to recirculate the exhaust gas once discharged to the exhaust line 3 to the combustion chamber 10 and to have the unburned HC in the exhaust gas involved in combustion again. Emissions can thereby be reduced.

Process (6) is a control for stabilizing combustion by increasing the intake gas flow speed. This control is executed after the catalyst is heated up and the unburned HC is oxidized in the exhaust line. For oxidization of unburned HC, the temperature of exhaust gas must be, for example, at least 700° C., and there needs to be sufficient oxygen for oxidization. This is a lean atmosphere in terms of the air-to-fuel ratio. When such engine conditions have been met, process (6) is executed. In this process, the intake valve 11 is retarded, while the exhaust valve 12 is advanced. When the intake valve 11 is retarded, the intake valve 11 opens after TDC for intake has passed and there appears a pressure difference between the intake line 2 and the combustion chamber 10. Since the intake valve 11 opens under the existence of such a pressure difference, the intake flow into the combustion chamber 10 increases and the injected fuel becomes well sprayed. By virtue of such improvement in the mixing state of air and fuel in the combustion chamber 10, the state of combustion is stabilized.

As described above, the aims of processes (1) and (3) are to make the catalyst active early upon cold starting by supplying heat to the catalyst. The aims of processes (4) to (6) are to prevent the emission of unburned HC. The present embodiment particularly focuses on processes (4) and (5). In the description that follows, controlling opening and closing of the intake valve 11 and the exhaust valve 12 is omitted, since engine cranking is explained in detail with the accompanying drawings.

Figure 3:
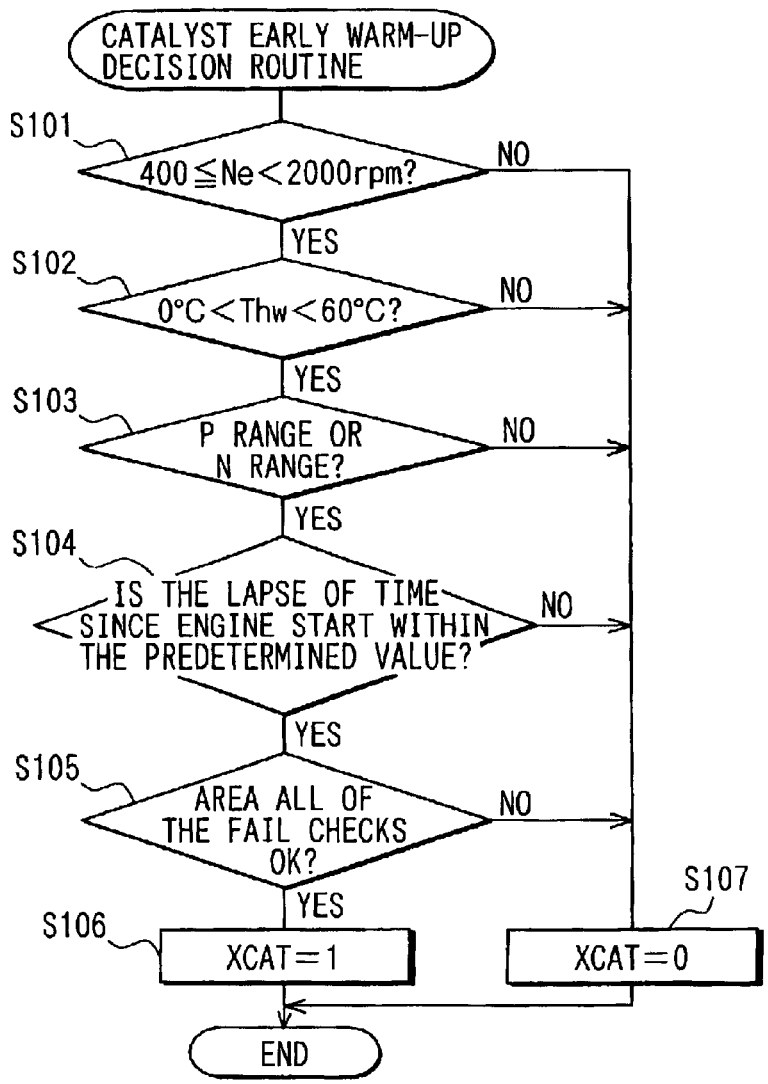
FIG. 3 is a flowchart illustrating the decision process for the catalyst early warm-up control in the first embodiment.

Referring now to FIG. 3, the decision routine for heating the catalyst decides whether or not to increase the amount of intake air for early warm-up of the catalyst and whether or not to retard the ignition timing. At step S101, whether the engine rotation speed, Ne, is in the range from 400 to 2000 rpm is checked. At step S102, it is checked whether the coolant temperature is in the range from 0 to 60° C. At step S103, it is checked whether the shift position of the automatic transmission (not shown) is in the P range or the N range. In the case of a manual transmission system, it is checked whether the gear position is in the N range or either of the first gear and top gear positions in the drive range.

At step S104, it is checked whether the lapse of time since engine 1 started is longer than a predetermined time or not. This predetermined time is set to the time necessary for completing catalyst early warm-up. Step S105 checks for a fail in various fail checks. Only when all the outputs of steps S101–S105 are YES, "1" is entered to the flag, XCAT, for execution of the catalyst early warm-up, and then the routine is completed. On the other hand, when any output of steps S101–105 is NO, "0" is entered to the flag XCAT at step S107 and then the routine is completed.

Figure 4:
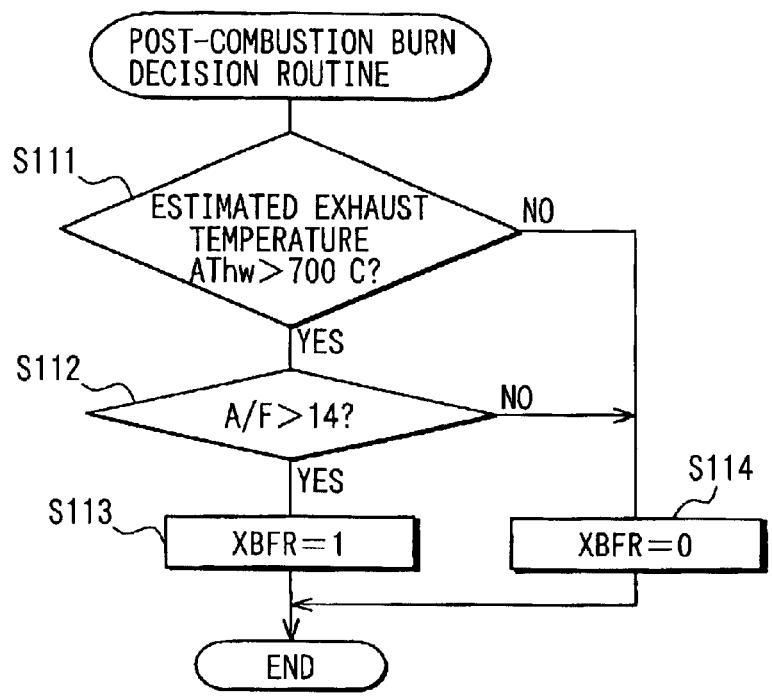
FIG. 4 is a flowchart that checks the post-combustion engine condition for causing the oxidization of unburned HC discharged from the engine in the first embodiment.

FIG. 4 describes the decision routine for the post-combustion burn. This routine examines whether oxidization will occur in the exhaust line 3 by increasing the amount of intake air for the early warming of the catalyst and by retarding the ignition timing. At step S111, it is checked whether the estimated exhaust temperature is at least 700° C. or not. At step S112, it is checked whether the estimated air-to-fuel ratio is at least, for example, 15 or not, in other words, lean or not. The air-to-fuel ratio is estimated from the amount of intake air and that of injected fuel. When the A/F sensor has been activated, the sensor may be used to directly measure the air-to-fuel ratio.

In this routine, when the two conditions are met, it proceeds to step S113 to enter "1" in the flag, XBFR, so as to indicate the post-combustion burn is possible in the engine 1 and then ends the routine. On the other hand, when either of the outputs of steps S111 and S112 is NO, the routine proceeds to step S114 and enters "0" in flag XBFR, indicating that the post-combustion burn does not occur in the engine 1, and then ends the routine.

Figures 11, 12A, 12B, 12C, 13:
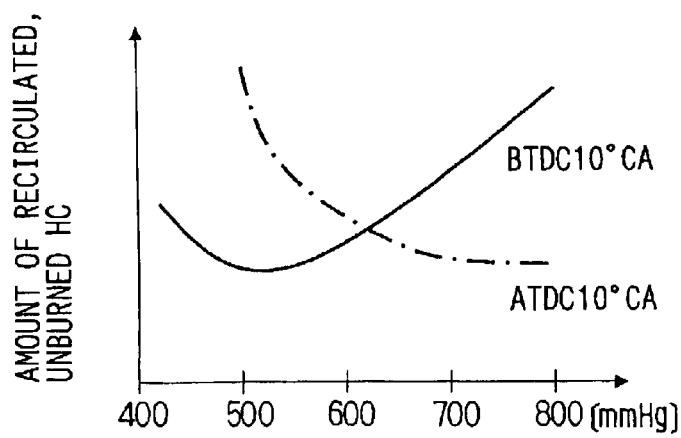
FIG. 11 is a map for setting the exhaust valve close timing in accordance with coolant temperature.
FIG. 12A is a map of the ignition timing and the amount of intake air, Ga.
FIG. 12B is a map of the estimated A/F and the correction coefficient, FABF.
FIG. 12C is a map of the lapse of time since engine start and the correction coefficient, FTIME.
FIG. 13 is a graph of the amount of unburned HC to be recirculated to combustion in accordance with pressure in the intake line for each exhaust valve close timing.

For estimating exhaust temperature, the base exhaust temperature is calculated from the map of FIG. 12A based on the ignition timing and the amount of intake air, Ga. Based on the map of FIGS. 12B and 12C, the base exhaust temperature is corrected with reference to the air-to-fuel ratio and the lapse of time after engine starting. In the correction based on the air-to-fuel ratio, an air-to-fuel ratio is estimated from the amount of intake air and the amount of injected fuel to calculate a correction coefficient, FABF, each corresponding to the air-to-fuel ratio. For example, if the estimated air-to-fuel ratio is 13, correction coefficient FABF is set to 0.9. If the estimated air-to-fuel ratio is 15, FABF is set to 1.1. Namely, when the air-to-fuel ratio is on the lean side and thus the combustion temperature is expected to be high, the correction coefficient is set to a value of 1 or larger for the base exhaust temperature. The final estimate of exhaust temperature is provided by multiplying the base exhaust temperature by this correction coefficient.

Alternatively, the exhaust temperature may be estimated from the lapse of time after engine starting. The procedures to decide the base exhaust temperature are the same as that above. A correction coefficient, FTIME, is calculated according to the lapse of time after engine starting. For example, when the lapse of time is one second, correction coefficient FTIME is set to 0.9, and when 10 seconds, FTIME is 1.05. During the short period after engine starting, the exhaust temperature is low, compared with the temperature during lean combustion, because the air-to-fuel ratio is rich. As time goes by since engine starting, the air-to-fuel ratio moves to the lean side. In this way, it is possible to accurately estimate exhaust temperature by raising estimated temperature corresponding to the lapse of time.

Figure 7:
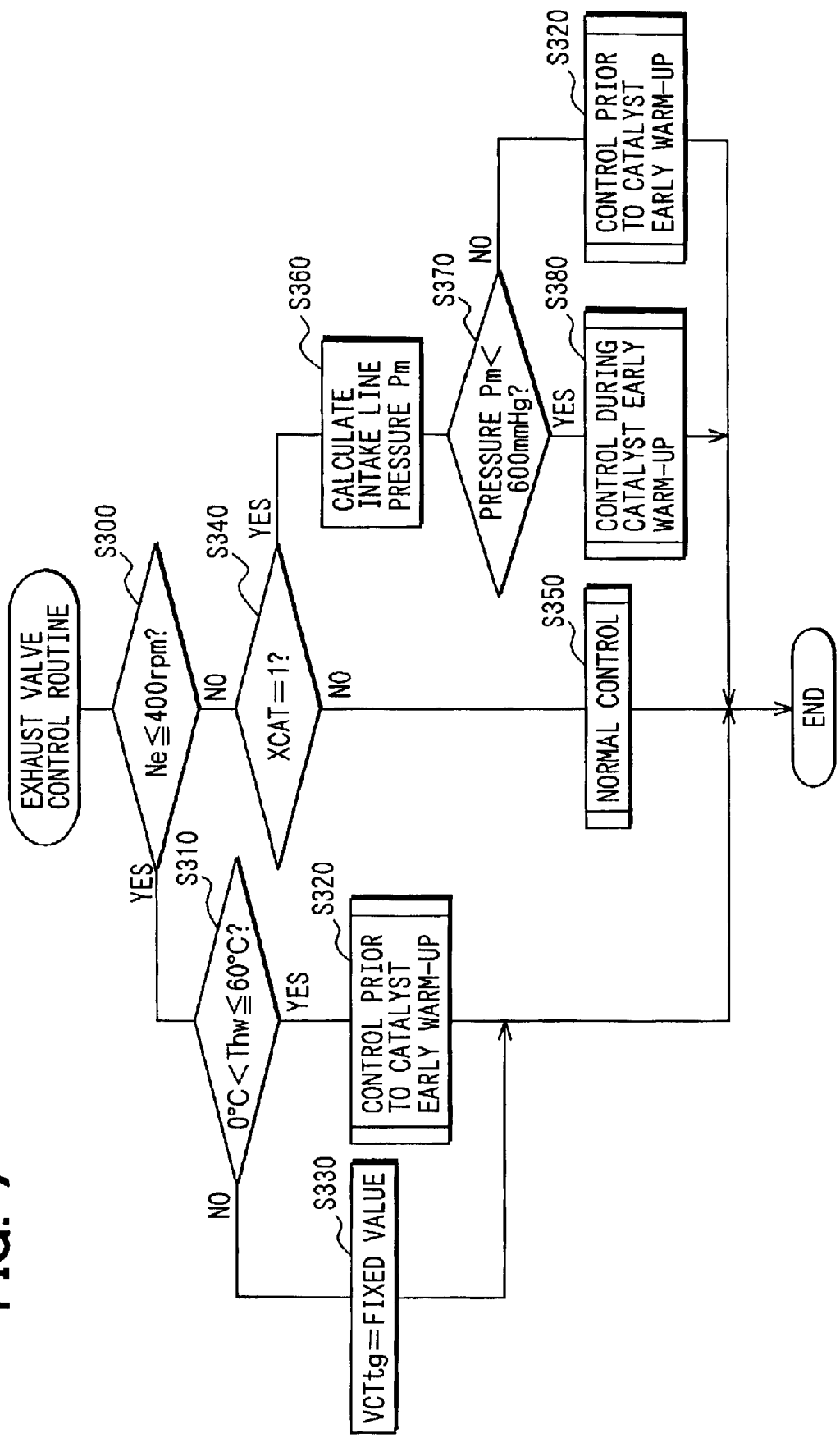
FIG. 7 is an exhaust valve control routine of the first embodiment.
Figure 10:
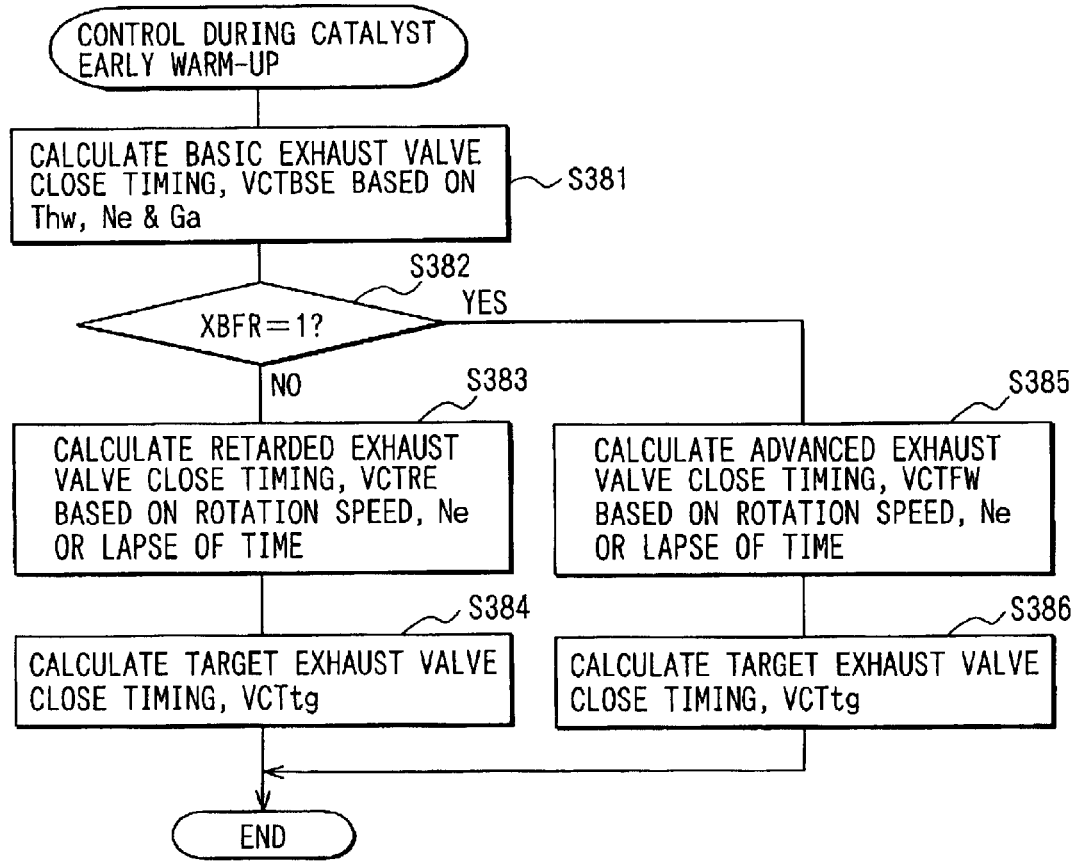
FIG. 10 is a control subroutine during catalyst early warm-up of the first embodiment.

The results of decisions provided in FIG. 3 and FIG. 4 will be used in the flowcharts of FIG. 7 and FIG. 10.

Figure 5:
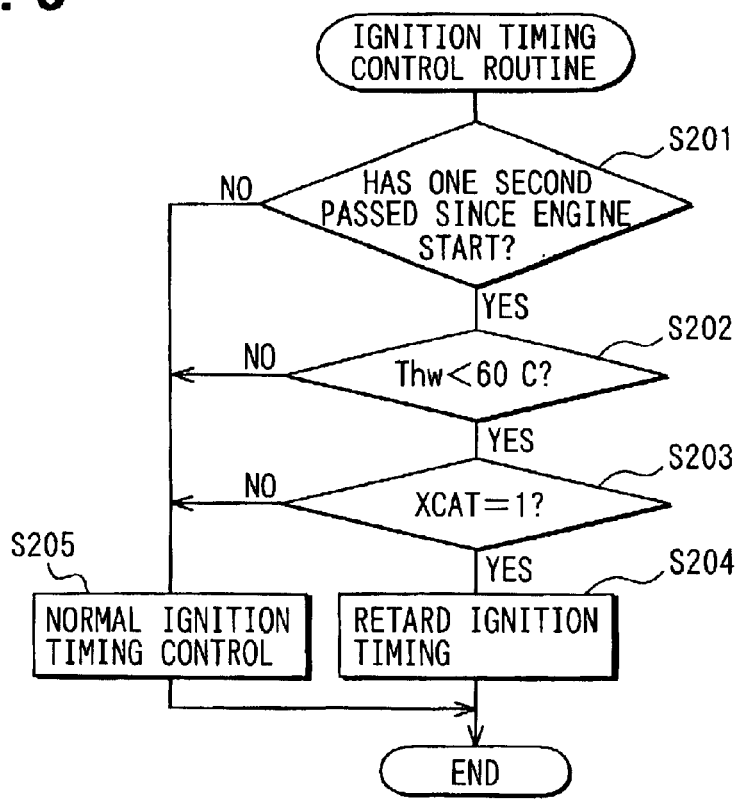
FIG. 5 is a flowchart illustrating the ignition timing control in the first embodiment.
Figure 6:
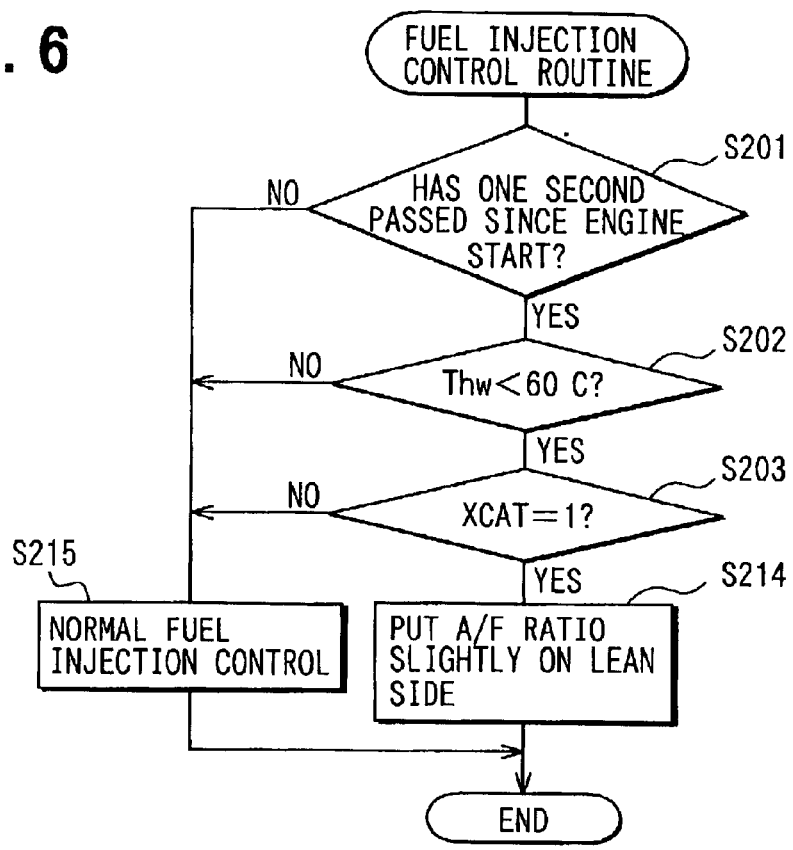
FIG. 6 is a flowchart illustrating the fuel injection control in the first embodiment.

Next, the software program for controlling the ignition timing and fuel injection timing of FIG. 5 and FIG. 6 will be explained. Steps S201–S203 check whether one second has passed since engine starting, whether the engine coolant temperature, Thw, is less than 60° C., and whether the decision flag for catalyst warm-up, XCAT, is "1". If all the outputs from steps S201–203 are YES, the routine proceeds to step S204 to delay the ignition timing. This delay control is a prior art control for catalyst early warm-up. On the other hand, if any output of the three steps is NO, it proceeds to step S205. Step S205 is normal ignition timing control and sets ignition timing in accordance with engine conditions.

Now, the software program for controlling fuel injection, with reference to FIG. 6, will be explained. Similar steps have similar numerals in the flowcharts of FIGS. 5 and 6, and descriptions of the similar numerals will not be repeated. If all the outputs of steps S201–S203 are YES, the routine proceeds to step S214 and sets the fuel injection so that the air-to-fuel ratio is lean. On the other hand, if any of the outputs of steps S201–S203 is NO, it proceeds to step S215. At step S215, the fuel injection is controlled with reference to the amount of intake air so as to provide a desired air-to-fuel ratio.

In this way, when the requirements for early catalyst warm-up are satisfied, the ignition timing and the fuel injection are set to the values for executing early catalyst warm-up. Operation of the present embodiment is based on the premises of increasing the amount of intake air, setting the air-to-fuel ratio lean for the control of fuel injection and retarding the ignition timing.

Now the open and close timings of the intake valve 11 and the exhaust valve 12 will be explained in detail with reference to the accompanying drawings. FIG. 7 shows the routine for controlling the exhaust valve. This routine is repeated in synchronization with, for example, a predetermined crank angle, each time an ignition switch (not shown) is turned on. When the routine of the flowchart shown in FIG. 7 begins, it examines at step S300 whether the engine rotation speed, Ne, is no more than 400 rpm. If the rotational speed of the engine 1 is under the predetermined value, steps S310–S330 are performed.

Figure 8:
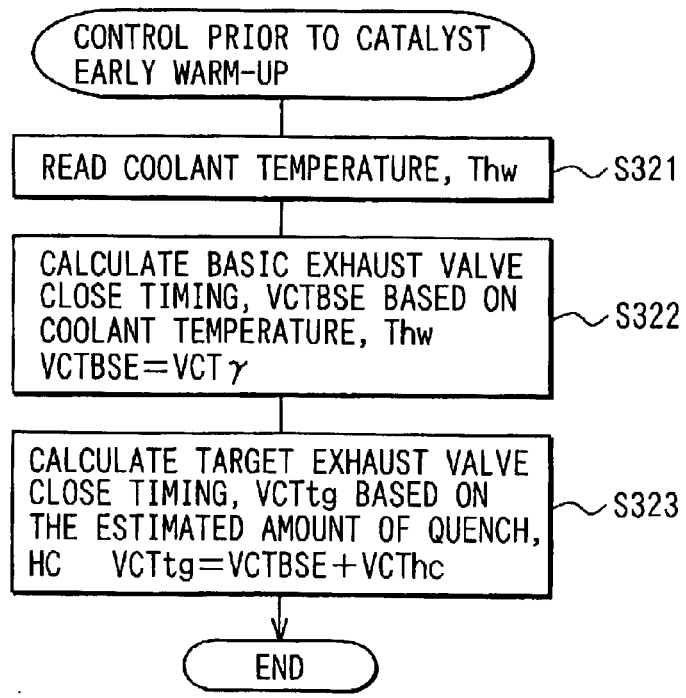
FIG. 8 is a control subroutine prior to catalyst early warm-up of the first embodiment.

At step S310, if the engine coolant temperature, Thw, is out of the 0–60° C. range, the routine proceeds to step S330 and then ends the routine, entering a predetermined fixed value in the target close timing, VCTtg, for the exhaust valve 12. On the other hand, if coolant temperature Thw is in the 0–60° C. range, it proceeds to step S320 to execute the control prior to the catalyst early warm-up. The steps in the flowchart of FIG. 8 are executed prior to the catalyst early warm-up. Those pre-warmup steps will be described later in detail.

If engine rotation speed Ne exceeds 400 rpm at step S300, step S300 returns YES and executes step S340 and the latter steps. Step S340 checks whether flag XCAT, which indicates the criteria for the catalyst early warm-up, is "1" or not. If flag XCAT is "0", namely, if the catalyst warm-up is not executed, the routine proceeds to step S350 and controls the open and close timing of the exhaust valve 12 based on the prior art control sequence.

Figure 9:
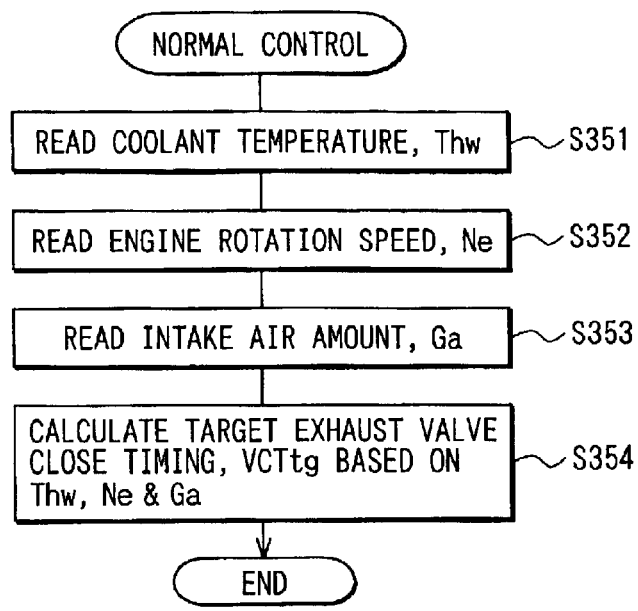
FIG. 9 is a normal control subroutine of the first embodiment.

In this common control shown in the flowchart of FIG. 9, steps S351, S352 and S353 read coolant temperature Thw, engine rotation speed Ne, and amount of intake air Ga, respectively. Then the routine comes to an end, setting a target valve close timing, VCTtg, of the exhaust valve 12 corresponding to engine conditions, using a three-dimensional map and the like.

Meanwhile, if flag XCAT is "1" at step S340 in FIG. 7, namely, if the catalyst early warm-up control is allowed, the routine proceeds to step S360. Step S360 calculates pressure Pm in the exhaust line 2 based on the amount of intake air Ga, measured by the air flowmeter 45a and engine rotation speed Ne. Pressure Pm in the exhaust line 2 is read from a two-dimensional map or the like of the amount of intake air Ga, and the engine rotation speed Ne. At step S370, it is checked whether the calculated pressure, Pm, in the exhaust line 2 is lower than, for example, 600 mmHg or not.

The aim of checking pressure Pm in the intake line 2 is to reduce emissions by making full use of the so-called exhaust gas recirculation (EGR) effect that places unburned HC into combustion again. There are two methods for making the best use of the EGR effect. One is to confine combustion gas in the combustion chamber by closing the exhaust valve 12 before completion of the gas exhaust process. The second is to recirculate post-combustion gas discharged to the exhaust line 3 back to the combustion chamber by controlling the period of the time that both the intake valve 11 and the exhaust valve 12 are open. This period of time is called the valve overlap period. Both techniques deliver the EGR effect that directs unburned HC to combustion again.

In particular, when the discharged gas is returned to the combustion chamber, the amount of gas to be returned is determined by a pressure difference between the intake line 2 and the exhaust line 3. Since the pressure in the exhaust line 3 is always close to atmospheric pressure, it is used as a reference. The pressure difference between the intake line 2 and the exhaust line 3 is determined by pressure Pm in the intake line 2. Referring now to FIG. 13, the solid line represents the values given when the exhaust valve close timing is at BTDC10° CA, while dot-dash line represents those at ATDC10° CA. When the pressure Pm in the intake line 2 is large, the pressure difference between the intake line 2 and the exhaust line 3 is small. Then, if the close timing of exhaust valve 12 is retarded (by controlling the valve overlap period), a sufficient EGR effect is not achieved because the post-combustion gas discharged to the exhaust line 3 is not, in sufficient quantity, returned to the combustion chamber. In such a case, the other EGR effect, namely, trapping post-combustion gas (by advancing the close timing of the exhaust valve 12), is more effective in reducing unburned HC and emission.

According to the above principle, if the pressure Pm in the intake line 2 is at least, for example, 600 mmHg, the routine proceeds to step S320 to use an EGR effect by advancing the valve close timing for the exhaust valve 12, because the pressure difference between the intake line 2 and the exhaust line 3 is small. Step S320 executes the control prior to the catalyst early warm-up so as to advance the close timing of the exhaust valve 12 and then complete the routine. On the other hand, if pressure Pm is no more than 600 mmHg, the routine proceeds to step S380 to utilize the other EGR effect by retarding the close timing of the exhaust valve 12 (by setting a valve overlap period). Step S380 executes the catalyst early warm-up control so as to delay the close timing of the exhaust valve 12 and then completes the routine.

As described above, the present embodiment reduces the emission of unburned HC by trapping the quench HC in the combustion chamber so as to reduce the quench HC produced upon engine starting through the control executed prior to the catalyst early warm-up. Meanwhile, the emission of unburned HC is also reduced by delaying the close timing of the exhaust valve 12 and thereby recirculating post-combustion gas to the combustion chamber when pressure Pm in the intake line 2 becomes lower than a predetermined value, for example, 600 mmHg.

Figure 16A:
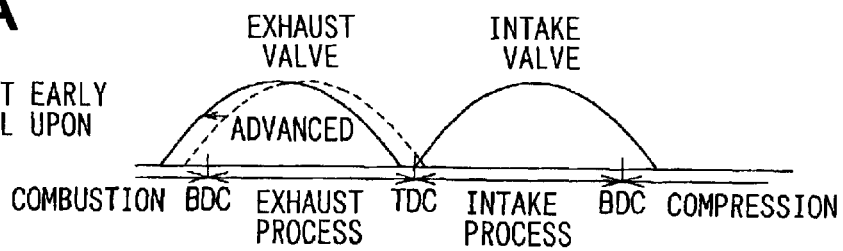
FIGS. 16A–16C is a timing chart illustrating the exhaust valve close timings of an embodiment of the present invention.

Next, the flowcharts of FIG. 8 and FIG. 10 will help to explain how to control the close timing of the exhaust valve 12 before and during the catalyst early warm-up control. In the early warm-up control for catalyst shown in the flowchart of FIG. 8, coolant temperature Thw of the engine 1 is read at step S321. Step S322 calculates the basic valve close timing, VCTBSE, of the exhaust valve 12 from the map of FIG. 11 based on the read coolant temperature Thw. Step S323 estimates the amount of quench HC adhering to the combustion chamber and sets the target exhaust valve close timing, VCTtg, to the advanced position across TDC of the intake process, as shown in FIG. 16A. The amount of quench HC is estimated from information such as coolant temperature Thw, intake gas temperature, combustion chamber wall temperature, frequency of combustions since engine starting, lapse of time since engine starting, internal cylinder pressure, ignition timing, amount of intake air, and engine rotation speed Ne.

Quench HC is the unburned HC that has not been involved in combustion and adhered to the cylinder wall by pressure produced by combustion. The lower the cylinder wall temperature, the less the adhered quench HC is involved in combustion. The amount of quench HC not involved in combustion increases when the load on the engine 1 grows. These are the factors that should be accounted for when estimating the amount of quench HC. Specifically, the load on the engine 1 is calculated from the amount of intake air Ga, and the engine rotation speed Ne, and then the total amount of quench HC is calculated from the estimated engine load. Then, a correction coefficient is set for the total amount of quench HC with reference to the pressure in the cylinder. This correction coefficient is set to a value close to 1 as the cylinder pressure grows, while set to a value smaller than 1 as the cylinder pressure falls. This is because the higher the cylinder pressure or combustion pressure, the more quench HC adheres to the cylinder wall. The lower the cylinder wall temperature, the less the adhered quench HC is involved in combustion. The correction coefficient for quench HC is determined from the cylinder wall temperature estimated from, for example, the temperature of intake air, and coolant temperature.

As described above, the amount of quench HC is estimated, and the target exhaust valve close timing VCTtg is determined at step S323 of FIG. 8 based on the estimated amount of quench HC. Specifically, the target exhaust valve close timing, VCTtg, is calculated by adding correction coefficient VCThc corresponding to the amount of quench HC to the basic exhaust valve close timing VCTBSE set in step S322. The correction coefficient VCThc is set to a value that further advances target exhaust valve close timing VCTtg as the estimated amount of quench HC grows.

Note that, for simplicity in calculation, the amount of quench HC may be modified by only one of among coolant temperature Thw, intake gas temperature, combustion chamber wall temperature, frequency of combustions since engine start, lapse of time since engine start, internal cylinder pressure, ignition timing, amount of intake air, and engine rotation speed Ne.

Also, the amount of quench HC and wet fuel may be estimated in the flowchart of FIG. 8 to decide the degree of advancing target exhaust valve close timing VCTtg.

Now explained with reference to the flowchart of FIG. 10 is the control carried out during the catalyst early warm-up of step S380 shown in FIG. 7. At step S381, coolant temperature Thw, engine rotation speed Ne, and amount of intake air Ga are read, and the close timing of the exhaust valve is determined with reference to the three-dimensional map of those parameters, for example. Then the basic close timing, VCTBSE, is set to the calculated close timing of the exhaust valve, VCTa, and the routine proceeds to step S382.

At step S382, it is checked whether flag XBFR is "1" or not. XBFR indicates whether the condition for post-combustion burn is met or not. If flag XBFR is "1," which indicates that the condition for post-combustion burn is met, steps S385 and S386 are executed to complete the routine. On the other hand, unless the post-combustion condition is met, steps S383 and S384 are executed to finish the routine.

Figure 16B:
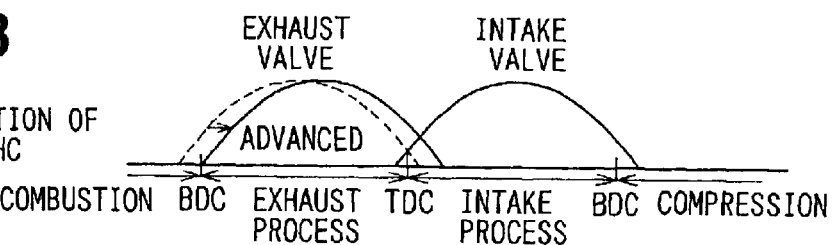

Hereafter, the control carried out when the condition for post-combustion burn is not met will be explained. At step S383, a degree of retarding VCTRE for closure of the exhaust valve 12 is determined in accordance with engine rotation speed Ne or lapse of time. Because the gas volume grows as rotation speed Ne increases, the amount of unburned HC increases accordingly. Thus the retarding degree, VCTRE, is set such that it grows as rotation speed Ne increases. Then, because the period that both intake valve 11 and the exhaust valve 12 are open becomes longer, more exhaust gas is returned to the combustion chamber and thus the unburned HC is again involved in combustion. As a result, the emission amount can be reduced. At step S384, target exhaust valve close timing VCTtg is set to a value which is basic close timing VCTBSE plus retarding degree VCTRE, calculated at step S383. At the same time, as shown in FIG. 16B, the close timing of the exhaust valve 12 is put behind TDC of the intake process, and the routine is completed.

Figure 16C:
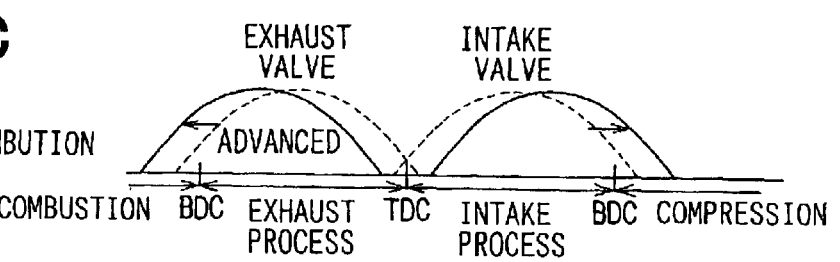

On the other hand, when the condition for post-combustion burn is met, or when flag XBFR is "1" at step S382, the routine proceeds to step S385, and forwarding degree VCTFW is calculated for the basic close timing of the exhaust valve 12 in accordance with rotation speed Ne or the lapse of time. When the condition for post-combustion burn is met, the air-to-fuel ratio is on the lean side and the unburned HC discharged upon combustion is oxidized in an oxygen atmosphere in the exhaust line 3. Since the air-to-fuel ratio is stabilized when the condition for post-combustion burn is met, the target close timing of the exhaust valve 12 is advanced to further stabilize combustion. Specifically, at step S386, the sum of the basic close timing of the exhaust valve 12 and the forwarding degree VCTFW calculated at step S385 is set to target close timing VCTtg for the exhaust valve 12. At the same time, as shown in FIG. 16C, the target close timing is put ahead of TDC of the intake process, and then the routine is finished.

In summary, the control of FIG. 10, which is carried out during the catalyst early warm-up, depends on the condition for post-combustion burn. Unless the condition for post-combustion burn is met, an overlap period of the time that both intake valve 11 and the exhaust valve 12 are open is provided by delaying the target close timing VCTtg of the exhaust valve 12, in order to reduce unburned HC produced during combustion. Since the unburned HC, once discharged in the exhaust line 3, is returned to the combustion chamber 10, the emission of unburned HC can be decreased. On the other hand, if the condition for post-combustion burn is met, since the unburned HC decreases through oxidization, the target close timing of the exhaust valve 12 is advanced for stabilizing combustion. As a result, the engine idle state can be stabilized by shortening the overlap period of the intake valve 11 and exhaust valve 12.

Now the present embodiment is described with reference to the time chart of FIGS. 15A–15H. FIG. 15A is a diagram illustrating the engine rotation speed Ne. First, when the ignition switch is turned on to begin cranking of the engine, the close timing of the exhaust valve 12 is set to BTDC (before top dead center) 10° CA based on the coolant temperature, as shown in FIG. 15D. During this control of valve close timing, the amount of quench HC and wet fuel produced is estimated from, for example, coolant temperature Thw. Corresponding to this amount, the close timing of the exhaust valve 12 is modified to control the amount of post-combustion gas that should be retained in the combustion chamber 10. In other words, when the engine is running and producing a lot of quench HC and wet fuel, the close timing of the exhaust valve 12 is corrected to advance so that the post-combustion gas that will be retained in the combustion chamber 10 may increase. Because this correction causes the unburned HC in the exhaust gas to burn in the next round of combustion, emissions are reduced.

Then engine rotation speed Ne of FIG. 15A is checked at point A in the figure, and "1" is entered to flag XCAT if coolant temperature Thw, gear position of the automatic transmission and other factors meet the requirements for executing the catalyst early warm-up control. If the requirements are met and flag XCAT is "1," the ignition timing is increasingly retarded, as shown in FIG. 15B. As engine rotation speed Ne of FIG. 15A grows, the pressure in the intake line 2 falls to 600 mmHg at point B in the figure. At point B, the close timing of the exhaust valve 12 is delayed in accordance with pressure Pm in the intake line 2. On the other hand, the open timing of the intake valve 11 of FIG. 15C is set to, for example, a point near TDC. Since the overlap period of the time that both intake valve 11 and the exhaust valve 12 are open is extended by delaying the close timing of the exhaust valve 12, the post-combustion gas, once discharged to the exhaust line 2, is returned to the combustion chamber 10. Then the unburned HC is involved in the next round of combustion and thereby its emission is reduced.

Point C in FIG. 15A is the moment the condition for post-combustion burn is met. The condition for post-combustion burn is satisfied when both the air-to-fuel ratio of FIG. 15F and the exhaust gas temperature of FIG. 15G meet the predetermined requirements. If the requirements are fulfilled, the unburned HC in combustion gas burns in the exhaust line. Since the emission of unburned HC is reduced under the engine conditions that make HC burn in the exhaust line, the open timing of the intake valve 11 is delayed to, for example, ATDC10° CA, as shown in FIG. 15C in order to stabilize combustion. If the open timing of the intake valve 11 is retarded as described above, the intake flow speed rises and the spraying of fuel is accelerated because a sufficient pressure difference between the intake line 2 and the combustion chamber 10 occurs when the intake valve 11 opens. In this case, the target close timing of the exhaust valve 12 is set to BTDC10° CA. Then the valve overlap period is shortened and combustion is thereby stabilized.

In this manner, the open and close timings of the intake valve 11 and the exhaust valve 12 are controlled in the present embodiment. Now compare this embodiment with the prior art technique that sets the close timing of the exhaust valve 12 to TDC as shown by the dashed line in FIG. 15D. As shown in FIG. 15H, the emission of unburned HC resulting from quench HC and wet fuel increases on the way to point A in FIG. 15A in the prior art shown by the dotted line. In the present invention, however, since the close timing of the exhaust valve 12 is advanced to confine post-combustion gas in the combustion chamber 10, the quench HC and wet fuel are involved in combustion again. As a result, their emission is reduced.

Later than point B in FIG. 15A, since engine rotation speed Ne exceeds the rotation speed indicating engine activation, the amount of intake air increases and accordingly the amount of unburned HC increases as well. Thus in the prior art technique shown by the dotted line, the produced unburned HC degrades the exhaust quality. However, since the overlap period of time that both the intake valve 11 and the exhaust valve 12 are open is properly set in the present invention, the combustion gas once discharged to the exhaust line 3 is recirculated to the combustion chamber 10. Then the unburned HC returned to the combustion chamber is again involved in combustion, and its emission is reduced accordingly.

As described so far, in the present embodiment, the close timing of the exhaust valve 12 is advanced or retarded in accordance with pressure Pm in the intake line 2 so as to reduce the amount of unburned HC discharged during the time that the catalytic converter has not been activated upon cold start. The amount of returned post-combustion gas, which is sent back to the combustion chamber by delaying the close timing of the exhaust valve, depends on a pressure difference between the intake line 2 and the exhaust line 3. Therefore, if such a gas recirculation is difficult to implement, the combustion gas is, in turn, retained in the combustion chamber by advancing the close timing of the exhaust valve 12 for reducing unburned HC emissions.

In the present embodiment, control using an electromagnetic valve was exemplified as a specific scheme for controlling the open and close timings of the exhaust valve 12, but there is no limitation to the means for controlling the timing. For example, the exhaust valve open and close timing may be controlled by conventional hydraulic mechanisms. Although the pressure in the intake line Pm has been measured at step S370 in the flowchart of FIG. 7 in the embodiment, Pm may be estimated.

In the present embodiment, confinement and recirculation of combustion gas are switched based on the pressure in the intake line. However, they may be switched at the moment a predetermined time has passed since engine starting.

In the embodiment, the exhaust valve control means corresponds to the flowchart of FIG. 7. A first engine condition detection means corresponds to step S370 in the flowchart of FIG. 7. A second engine condition detection means corresponds to steps S321–S323 in the flowchart of FIG. 8. A combustion state detection means corresponds to the flowchart of FIG. 4, an air-to-fuel ratio detection means corresponds to step S112 in the flowchart of FIG. 4, and an exhaust gas temperature detection means corresponds to step S111 of the flowchart of FIG. 4, respectively.

The intake valve control means is a means for controlling at least the open timing of the intake valve 11. Particularly, if pressure Pm in the intake line is lower than 600 mmHg at step S370 of FIG. 7, the means sets the timing at, for example, ATDC10° CA. The combustion gas treatment means corresponds to the catalytic converter using, for example, a three-way catalyst. The treatment capability detection means corresponds to the means that determines whether the catalytic converter is activated by heat or not.

(Second Embodiment)

In the first embodiment, the close timing of the exhaust valve 12 is controlled independently of the open timing of the intake valve 11 during the control of catalyst early warm-up of FIG. 10. In the second embodiment, however, a target valve overlap period is determined in advance and then the open timing of the intake valve 11 and the close timing of the exhaust valve 12 are controlled so that the actual overlap period agrees with the predetermined period.

In this embodiment, a target overlap period or a target underlap period is first determined for the control of catalyst early warm-up and then the open and close timings of the intake valve 11 and exhaust valve 12 are set. Note that the overlap period means the duration of the time both intake valve 11 and exhaust valve 12 are open, while the underlap period means the duration of the time both intake valve 11 and exhaust valve 12 are closed near TDC during intake.

Figure 14:
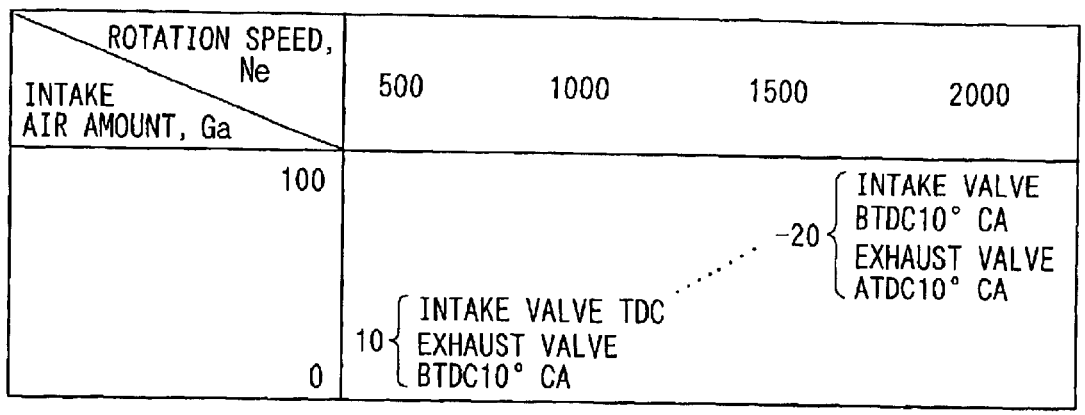
FIG. 14 is a map of rotation speed, Ne and intake air amount, Ga for setting the target underlap in a second embodiment.

FIG. 14 is a diagram illustrating how the underlap period is set according to the amount of intake air. The aim of setting an underlap period is to reduce the amount of unburned HC. When the amount of intake air is large, the amount of unburned HC also grows during combustion. In such a case, if a negative value is set to the underlap period, the combustion gas, once discharged to the exhaust line 3, is recirculated to the combustion chamber 10 and thereby emissions are reduced. On the other hand, if the amount of intake air is small, a positive value is set to the underlap period to retain post-combustion gas in the combustion chamber 10. In this manner, the amount of unburned HC can be effectively reduced by setting the underlap period or overlap period in the second embodiment.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A valve timing control device for an internal combustion engine, said device comprising:
an exhaust valve control means for controlling an exchaust valve close timing of an exhaust valve installed in the internal combustion engine; and
a first engine condition detection means for detecting or estimating an engine condition, wherein said exhaust valve control means advances or retards the exhaust valve close timing from an intake top dead center position based on the engine condition detected or estimated by said first engine condition detection means;

said first engine condition detection means detects pressure in an intake line, and said exhaust valve control means advances the exhaust valve close timing from the intake top dead center position when the pressure detected by said first engine condition detection means is larger than a predetermined value and retards the exhaust valve close timing from the intake top dead center position when the pressure detected by said first engine condition detection means is smaller than a predetermined value.

2. The valve timing control device according to claim 1, further comprising:

a second engine condition detection means for detecting the condition of the internal combustion engine, wherein said second engine condition detection means estimates an amount of wet fuel adhering to the intake line or an amount of unburned hydrocarbons adhering to a cylinder wall of the internal combustion engine, said wet fuel and said hydrocarbons being included in fuel injected from an injector supplying fuel to the internal combustion engine, and said exhaust valve control means sets a degree of advancing the exhaust valve close timing from the intake top dead center position based on the amount of said wet fuel and and/or unburned hydrocarbons adhering to the cylinder wall when advancing the exhaust valve close timing based on the condition of the internal combustion engine.

3. The valve timing control device according to claim 2, wherein said exhaust valve control means controls a degree of retarding the exhaust valve closing timing from the intake top dead center position so that a period of time when both the intake valve and the exhaust valve of the internal combustion engine are open agrees with a predetermined period when retarding the exhaust valve close timing from the intake top dead center position based on the condition of the internal combustion engine detected by said first engine condition detection means.

4. The valve timing control device according to claim 3, further comprising:

an intake valve control means for controlling at least the intake valve open timing, wherein said second engine condition detection means includes a combustion state detection means for detecting a combustion state of the internal combustion engine, said intake valve control means retards the intake valve open timing when said combustion state detection means detects a condition meeting requirements for oxidizing unburned exhaust line hydrocarbons, and said exhaust valve control means advances the exhaust valve close timing when said combustion state detection means detects stable combustion.

5. The valve timing control device according to claim 4, further comprising:

an air-to-fuel ratio detection means for detecting an air-to-fuel ratio in the internal combustion engine; and an exhaust temperature detection means for detecting or estimating a temperature of exhaust gas discharged from the internal combustion engine, wherein said combustion state detection means determines that the combustion state of the internal combustion engine is stable if said exhaust temperature detection means detects an exhaust temperature higher than a predetermined temperature and at the same time said air-to-fuel ratio detection means detects a combustion gas air-to-fuel ratio falling within a predetermined lean range, and said exhaust valve control means advances the exhaust valve close timing based on the detection results provided by said combustion state detection means.

6. A valve timing control device for an internal combustion engine, said device comprising:

an exhaust valve control means for controlling at least a close timing of an exhaust valve of the internal combustion engine; and a second engine condition detection means for detecting a condition of the internal combustion engine, wherein said exhaust valve control means advances the exhaust valve close timing from an intake top dead center position based on the engine condition detected by said second engine condition detection means since cold starting of the engine, said second engine condition detection means estimates an amount of wet fuel adhering to an intake line and/or an amount of unburned hydrocarbons adhering to a cylinder wall of the internal combustion engine, said wet fuel and hydrocarbons included in fuel injected from an injector supplying fuel to the internal combustion engine, and said exhaust valve control means sets a degree of advancing the exhaust valve close timing from the intake top dead center position based on the estimated amount of said wet fuel and/or unburned hydrocarbons adhering to the cylinder wall when advancing the exhaust valve close timing based on the condition of the internal combustion engine detected by said second engine condition detection means.

7. A valve timing control device for an internal combustion engine, said device comprising:

an exhaust valve installed in the internal combustion engine;

exhaust valve control means for controlling at least a close timing of said exhaust valve, wherein said exhaust valve control means advances the exhaust valve close timing from an intake top dead center position upon cold starting of the internal combustion engine, a combustion gas treatment means installed in an exhaust line of the internal combine engine, wherein the combustion gas treatment means treats combustion gas discharged from the internal combustion engine; and a treatment capability detection means for detecting a combustion gas treatment capability of said combustion gas treatment means, wherein said exhaust valve control means advances the exhaust valve close timing from the intake top dead center position upon internal combustion engine starting when said treatment capability detection means detects a low combustion gas treatment capability in said combustion gas treatment means.

8. The valve timing control device according to claim 7, wherein said valve control means retards the exhaust valve close timing from the intake top dead center position when a predetermined time has passed since internal combustion engine starting.

9. A valve timing control device for an internal combustion engine, said device comprising:
- an exhaust valve control means for controlling an exhaust valve close timing of an exhaust valve installed in the internal combustion engine; and
- a first engine condition detection means for detecting or estimating an engine condition, wherein
- said exhaust valve control means advances or retards the exhaust valve close timing from an intake top dead center position based on the engine condition detected or estimated by said first engine condition detection means;
- said first engine condition detection means estimates, in an intake line, a parameter related to pressure, and
- said exhaust valve control means advances the exhaust valve close timing from the intake top dead center position when the parameter estimated by said first engine condition detection means is larger than a predetermined value and retards the exhaust valve close timing from the intake top dead center position when the parameter estimated by said first engine condition detection means is smaller than a predetermined value.

10. A valve timing control device for an internal combustion engine, said device comprising:
- an exhaust valve control means for controlling an exhaust valve close timing of an exhaust valve installed in the internal combustion engine; and
- a first engine condition detection means for detecting or estimating an engine condition, wherein
- said exhaust valve control means advances or retards the exhaust valve close timing from an intake top dead center position based on the engine condition detected or estimated by said first engine condition detection means;
- a second engine condition detection means for detecting the condition of the internal combustion engine, wherein
- said second engine condition detection means estimates an amount of wet fuel adhering to the intake line or an amount of unburned hydrocarbons adhering to a cylinder wall of the internal combustion engine, said wet fuel and said hydrocarbons being included in fuel injected from an injector supplying fuel to the internal combustion engine, and
- said exhaust valve control means sets a degree of advancing the exhaust valve close timing from the intake top dead center position based on the amount of said wet fuel and/or unburned hydrocarbons adhering to the cylinder wall when advancing the exhaust valve close timing based on the condition of the internal combustion engine.

* * * * *